(12) United States Patent
Van Der Wilk et al.

(10) Patent No.: US 11,475,279 B2
(45) Date of Patent: Oct. 18, 2022

(54) COMPUTATIONAL IMPLEMENTATION OF GAUSSIAN PROCESS MODELS

(71) Applicant: SECONDMIND LIMITED, Cambridge (GB)

(72) Inventors: Mark Van Der Wilk, Cambridge (GB); Sebastian John, Cambridge (GB); Artem Artemev, Cambridge (GB); James Hensman, Cambridge (GB)

(73) Assignee: SECONDMIND LIMITED, Cambridge (GB)

( * ) Notice: Subject to any disclaimer, the term of this patent is extended or adjusted under 35 U.S.C. 154(b) by 0 days.

(21) Appl. No.: 17/643,315

(22) Filed: Dec. 8, 2021

(65) Prior Publication Data

US 2022/0101106 A1 Mar. 31, 2022

Related U.S. Application Data

(63) Continuation of application No. PCT/EP2020/074023, filed on Aug. 27, 2020.

(30) Foreign Application Priority Data

Sep. 2, 2019 (EP) .................................... 19195000

(51) Int. Cl.
*G06N 3/04* (2006.01)
*G06N 3/063* (2006.01)

(52) U.S. Cl.
CPC ........... *G06N 3/0472* (2013.01); *G06N 3/063* (2013.01)

(58) Field of Classification Search
CPC ...... G06N 3/0472; G06N 3/063; G06N 20/00; G06N 3/006; G06N 7/005
See application file for complete search history.

(56) References Cited

U.S. PATENT DOCUMENTS

2014/0358831 A1 12/2014 Adams et al.

FOREIGN PATENT DOCUMENTS

| EP | 3467717 | 4/2019 |
| EP | 3467718 | 4/2019 |

OTHER PUBLICATIONS

Salimbeni et al., "Doubly Stochastic Variational Inference for Deep Gaussian Processes", 2017, 31st Conference on Neural Information Processing Systems (NIPS 2017), pp. 1-12 (Year: 2017).*

(Continued)

*Primary Examiner* — Brent Johnston Hoover
(74) *Attorney, Agent, or Firm* — Kilpatrick Townsend & Stockton LLP (57) ABSTRACT

First parameters of a variational Gaussian process (VGP) (including a positive-definite matrix-valued slack parameter) are initialized and iteratively modified change an objective function comprising an expected log-likelihood for each training data item under a respective Gaussian distribution with a predictive variance depending on the slack parameter. Modifying the first parameters comprises, for each training data item, determining a respective gradient estimator for the expected log-likelihood and modifying the first parameters in dependence on the determined gradient estimators. At an optimal value of the slack parameter, the slack parameter equals an inverse of a covariance matrix for the set of inducing variables, and the objective function corresponds to a variational lower bound of a marginal log-likelihood for a posterior distribution corresponding to the GP prior conditioned on the training data.

20 Claims, 7 Drawing Sheets

(56) References Cited

OTHER PUBLICATIONS

Van Der Wilk et al., "Learning Invariances using the Marginal Likelihood", 2018, 32nd Conference on Neural Information Processing Systems (NeurIPS 2018), pp. 1-11 (Year: 2018).*
International Search Report and Written Opinion issued in PCT/EP2020/074023, dated Dec. 15, 2020, 9 pages.
Filippone et al: Enabling scalable stochastic gradient-based inference for Gaussian processes by employing the Unbiased Linear System SolvEr (ULISSE), Proceedings of the 32nd International Conference on Machine Learning, Lille, France, 2015, 10 pages.
Salimbeni et al: Doubly Stochastic Variational Inference for Deep Gaussian Processes, $31^{st}$ Conference on Neural Information Processing Systems, Nov. 13, 2017, 16 pages.

* cited by examiner

COMPUTATIONAL IMPLEMENTATION OF GAUSSIAN PROCESS MODELS

CROSS-REFERENCE TO RELATED APPLICATIONS

This application is a continuation of International Application No. PCT/EP2020/074023, filed Aug. 27, 2020, which claims priority to European Application No. 19195000.5, filed Sep. 2, 2019, which are hereby incorporated by reference in their entireties for all purposes.

TECHNICAL FIELD

The present invention relates to the computational implementation of Gaussian process models.

BACKGROUND

Gaussian process (GP) models provide a powerful and flexible means of inferring statistical quantities from empirical data. In recent years, GP models have been used in various contexts in machine learning, for example in classification tasks such as image classification and in regression tasks such as in engineering and other applications. GPs have further been proposed as a tool for predicting states of an environment in a reinforcement learning system as described in European patent publications EP3467717 and EP3467718. For an appropriate choice of kernel function, GPs have a high expressive capacity which can be further increased by composing multiple GP layers to form a deep Gaussian Process (DGP) model. GP models and DGP models automatically yield well-calibrated uncertainties, which are of particular importance when high-impact decisions are to be made on the basis of the model.

A Gaussian process (GP) is a collection of infinitely many indexed random variables of which every finite collection has a multivariate Gaussian distribution. The distribution of a Gaussian process is the joint distribution of the infinitely many random variables, and as such can be considered as a distribution over functions on a continuous domain. In a typical GP inference task, the objective is to fit a latent GP to a set of observed training data $D=\{(x_n,y_n)\}_{n=1}^N$ such that the trained GP can be used to predict a distribution of an output value y* at an unobserved input location x*. This description encapsulates regression, in which an output y corresponds to one or more attributes of a corresponding input location x, and classification, in which an output y corresponds to a probability of the input location x being associated with a given class. A single-layer GP model can be expressed as:

$$p(f(\cdot))=GP(\mu(\cdot),k(\cdot,\cdot')), \, p(y|f(\cdot))=\Pi_{n=1}^N p(y_n|f(\cdot)), \quad (1)$$

where $y=\{y_n\}_{n=1}^N$ and it has been assumed that the likelihood $p(y|f(\cdot))$ factorizes over the training data in the dataset D, which corresponds to the assumption that the training outputs $y_n$ can be modelled as independent random variables. The GP prior $p(f(\cdot))$ is defined using a mean function $\mu(\cdot)$ and a kernel $k(\cdot,\cdot')$, where $\cdot$ and $\cdot'$ denote unspecified input locations. The training process seeks to determine or approximate the posterior process $p(f(\cdot)|y)$ corresponding to the GP prior conditioned on the training data. In the model of Equation (1), the function $f(\cdot)$ and the outputs $y_n$ are written as scalars, but the methods described herein are equally valid for multi-output GPs in which the function $f(\cdot)$ and optionally the outputs $y_n$ are vectors.

Variational inference proceeds with the introduction of a set of inducing variables $u=f(Z)$, where $Z=\{z_m\}_{m=1}^M$ is a set of M inducing inputs which may be in the same domain as the input data $x_n$ or may be in a different domain. Using inducing inputs significantly reduces the computational cost of the training process provided that the number of inducing points is much smaller than the number of training data, i.e. M«N. The inducing variables are distributed according to a variational Gaussian distribution $q(u)=N(u|m, S)$, where the mean m and covariance S are to be determined during training. Marginalizing the posterior process $q(f(\cdot)|u)$ over the inducing variables u leads to a variational GP (VGP) given by Equation (2):

$$q(f(\cdot))=GP(k_u^T.K_{uu}^{-1}k_u,k\ldots-k_u^T.K_{uu}^{-1}k_{u'}+ k_u^T.K_{uu}^{-1}SK_{uu}^{-1}k_{u'}), \quad (2)$$

where $k\ldots, k_u$ and $K_{uu}$ are the covariances between an unspecified point $\cdot$ and the inducing variables u. For readability, the mean function $\mu(\cdot)$ has been set to zero, though the VGP method is straightforwardly extended to include a non-zero mean function.

A conventional way to train a VGP of the type given by Equation (2) is to iteratively modify the variational parameters m, S, Z along with any hyperparameters of the kernel k in order to minimise the Kullback-Leibler (KL) divergence between the VGP $q(f(\cdot))$ evaluated at the training data points and the Bayesian posterior $p(f(\cdot)|y)$ evaluated at the training data points. The KL divergence is given by Equation (3):

$$KL[q(f) \| p(f|y)] = \log p(y) - \mathcal{L}, \quad (3)$$

where $$\mathcal{L} = \sum_{n=1}^N \mathbb{E}_{N(f_n|\mu_n,\sigma_n^2)}[\log p(y_n|f_n)] - KL[q(u)\|p(u)], \quad (4)$$

with $\mu_n=k_{un}^T K_{uu}^{-1} m$, $\sigma_n^2=k_{nn}-k_{un}^T K_{uu}^{-1} k_{un}+k_{un}^T K_{uu}^{-1} S K_{uu}^{-1} k_{un}$, $f_n=f(x_n)$ and $f=\{f_n\}_{n=1}^N$. The KL divergence in Equation (3) is non-negative, with equality when the VGP $q(f(\cdot))$ matches the Bayesian posterior process $p(f(\cdot)|y)$. The quantity $\mathcal{L}$ is therefore a variational lower bound of the marginal log-likelihood log p(y). Maximising the variational bound $\mathcal{L}$ with respect to the variational parameters m, S, Z minimises the KL divergence between the VGP and the Bayesian posterior process. Maximising the variational bound with respect to the hyperparameters of the kernel maximises the marginal likelihood log p(y) of the training data, or in other words how well the exact model fits the training data. By treating the variational bound as an objective function to be maximised with respect to the variational parameters and the hyperparameters simultaneously, over a series of training iterations the VGP tends towards a Bayesian posterior process for an optimal GP prior.

Equation (4) shows that the objective function L includes an expected log-likelihood for each training data point under a Gaussian distribution with a predictive variance $\sigma_n^2$ corresponding to the variance of the VGP evaluated at that training data item. In this way, the objective function allocates a reward when the VGP yields a high probability density for the training data. The objective function further contains a KL term that penalises a deviation between the variational distribution q(u) for the inducing variables and the GP prior evaluated at the inducing inputs.

Figure 1:
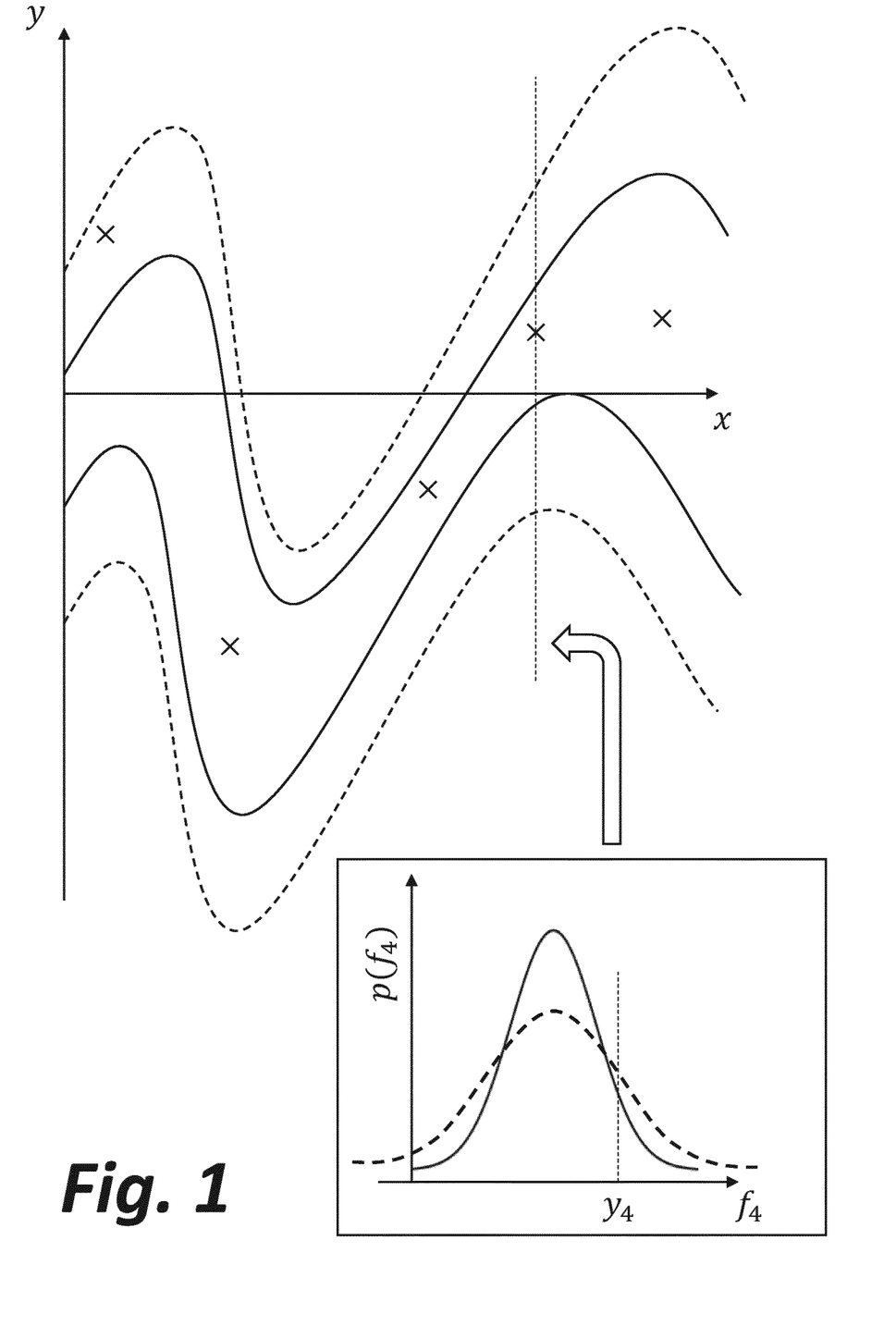
FIGS. 1 and 2 show an example of a variational Gaussian process (VGP) being optimised to fit a set of observed training data.
Figure 2:
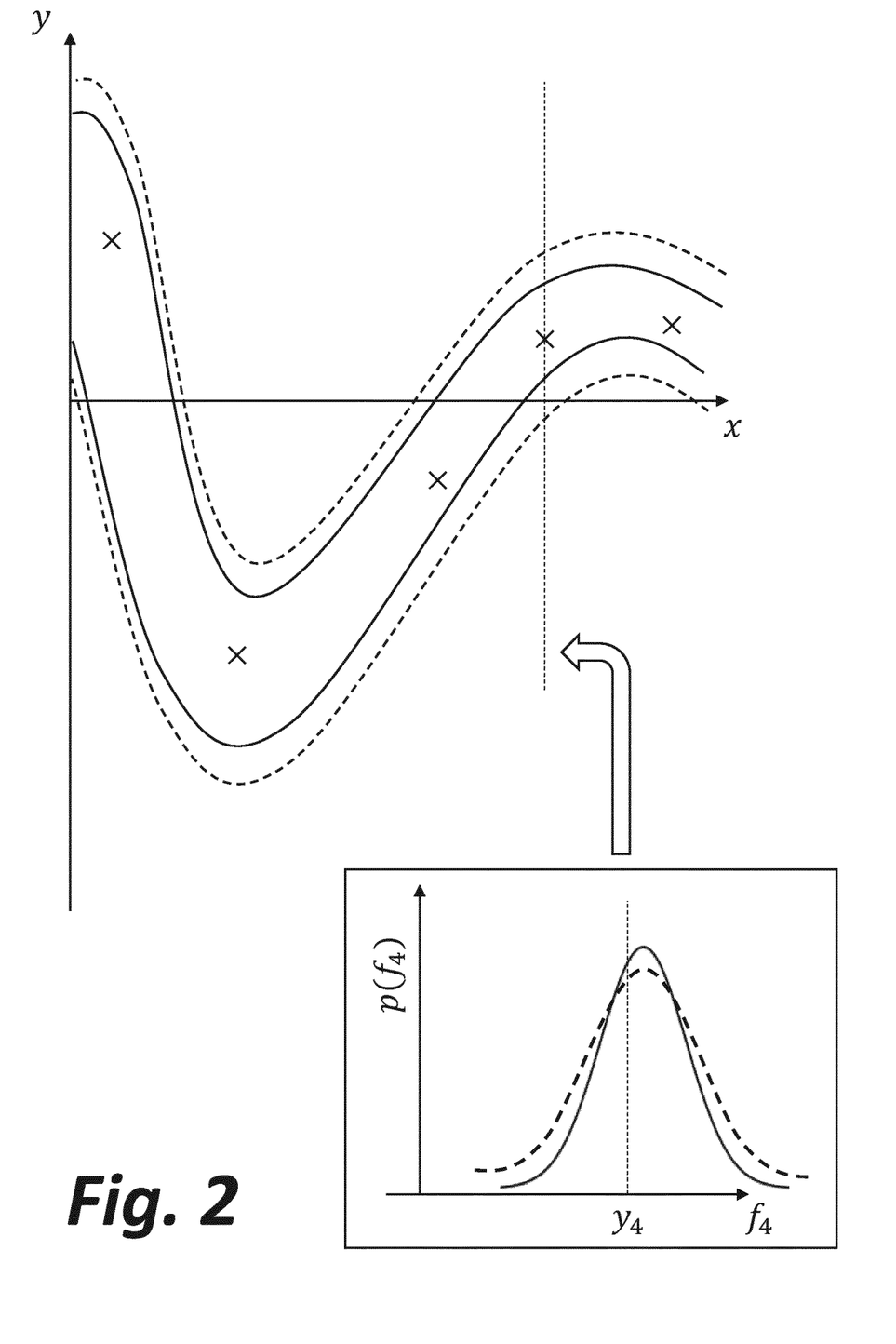

FIGS. 1 and 2 show an illustrative example of a VGP being trained to fit training data in a one-dimensional regression problem. Five training data points $\{(x_n, y_n)\}_{n=1}^5$ are shown as "X" symbols and the solid curves represent a single standard deviation above and below the posterior mean function of the VGP. The inner frame shows the normal distribution $p(f_4)=N(f_4|\mu_4, \sigma_4^2)$ corresponding to the VGP evaluated at the point $x_4$. FIG. 1 corresponds to an early training iteration, and it is observed that the VGP does not fit the data well. FIG. 2 corresponds to a later training iteration, and it is observed that the VGP more closely fits the data, whilst still providing a measurement of uncertainty via the variance of the VGP at each input location.

Existing methods maximise the objective function L (or equivalently, minimise $-\mathcal{L}$) with respect to the variational parameters and hyperparameters using gradient ascent/descent, stochastic gradient ascent/descent, or a variant thereof. In many cases, the expectation terms are intractable and must be estimated numerically, for example using Monte-Carlo sampling. However, even using Monte-Carlo sampling, it is necessary to determine the predictive mean $\mu_n$ and the predictive variance $\sigma_n^2$ at each training data location in order to estimate the expected log-likelihood of the training data. The computational cost of inverting the covariance matrix $K_{uu}$ is $O(M^3)$, whilst the computational cost of the matrix multiplications for each training data point is $O(M^2)$, resulting in a total computational cost of $O(NM^2+M^3)$ for evaluating or estimating the expectation terms at each training iteration. Stochastic gradient descent with mini-batches of size B can be used to reduce the computational cost to $O(BM^2+M^3)$ such that the $O(BM^2)$ term becomes negligible. However, the $O(M^3)$ cost of inverting the covariance matrix remains prohibitive for large numbers of inducing points, which are necessary to learn the complex structures that exist within large datasets. This computational cost prevents conventional GP variational inference from scaling to large datasets and accordingly from competing with deep neural network models in computer-implemented systems across a wide range of technical fields. Furthermore, the matrix inversion relies on serial operations which are not readily parallelized across multiple processor cores, and requires high precision arithmetic (for example, double precision arithmetic) to yield accurate results. The matrix inversion thus causes a bottleneck in the data processing routine whilst preventing the routine from being implemented efficiently with specialist deep learning hardware such as neural processing units (NPUs) or neural network accelerators (NNAs), which are optimised for highly parallelized computations with low precision arithmetic.

SUMMARY

According to a first aspect of the present invention, there is provided a computer-implemented method of processing, using a plurality of processing cores, training data comprising a plurality of training data items to determine parameters of a Gaussian process (GP) model comprising a variational Gaussian process (VGP) corresponding to a GP prior conditioned and marginalized with respect to a set of randomly-distributed inducing variables. The method includes initializing first parameters of the VGP including a positive-definite matrix-valued slack parameter, and iteratively modifying the first parameters to increase or decrease an objective function comprising an expected log-likelihood for each training data item under a respective Gaussian distribution with a predictive variance depending on the slack parameter. At each iteration, modifying the first parameters comprises, for each training data item, determining a respective gradient estimator for the expected log-likelihood using a respective one of the plurality of processor cores, and modifying the first parameters in dependence on the determined gradient estimators. At an optimal value of the slack parameter, the slack parameter is equal to an inverse of a covariance matrix for the set of inducing variables, and the objective function corresponds to a variational lower bound of a marginal log-likelihood for a posterior distribution corresponding to the GP prior conditioned on the training data.

Introducing the matrix-valued slack parameter to be optimised alongside other parameters of the VGP removes the need to invert a covariance matrix at each training iteration, and the computational cost of determining the optimal inverse covariance matrix is effectively amortised over multiple training iterations. In this way, the computational bottleneck caused by the matrix inversion is removed from the training procedure, and the data processing at each training iteration can be performed in a highly parallelized manner, for example using multiple cores in a specialised processor such as a graphics processing unit (GPU) or a neural network accelerator (NNA), or over multiple computer nodes in a distributed computer system.

Further features and advantages of the invention will become apparent from the following description of preferred embodiments of the invention, given by way of example only, which is made with reference to the accompanying drawings.

DETAILED DESCRIPTION

Figure 3:
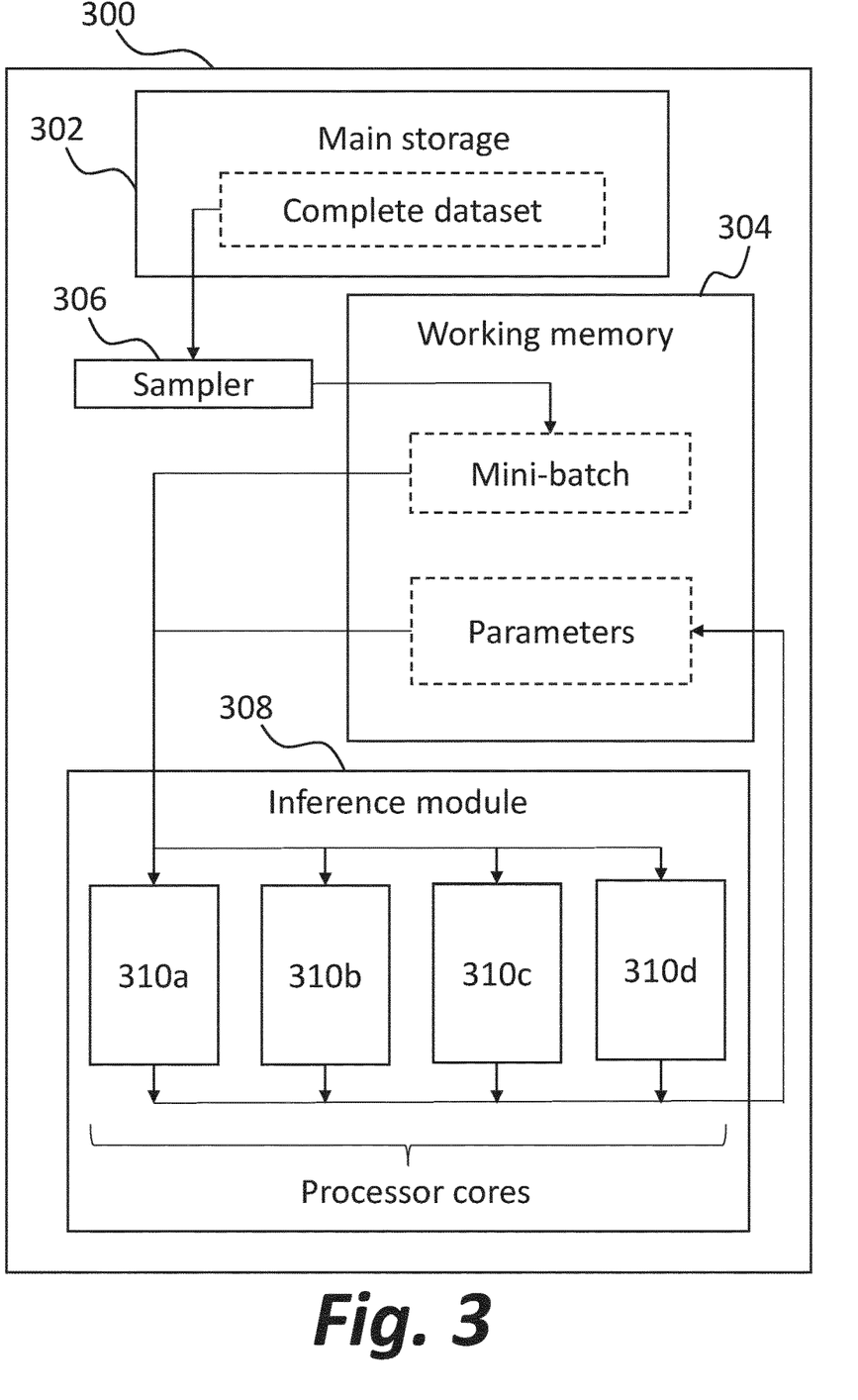
FIG. 3 is a flow diagram representing a method of training a VGP in accordance with an embodiment of the present invention.

FIG. 3 shows an example of a data processing system 300 arranged to perform statistical inference in accordance with an embodiment of the present invention. The system includes various additional components not shown in FIG. 3 such as input/output devices, network interfaces, and the like. The data processing system 300 includes first memory circuitry including main storage 302, which in this example is a solid-state drive (SSD) for non-volatile storage of relatively large volumes of data. In other examples, a data processing system may additionally or instead include a hard disk drive and/or removable storage devices as first memory circuitry. The data processing system 300 further includes second memory circuitry including working memory 304, which in this example includes volatile random-access memory (RAM), in particular static random-access memory (SRAM) and dynamic random-access memory (DRAM).

The working memory 304 is more quickly accessible by processing circuitry than the main storage 302 but has a significantly lower storage capacity. In this example, the main storage 302 is capable of storing an entire dataset D containing N training data points. By contrast, in this example the working memory 304 has insufficient capacity to store the entire dataset D but has sufficient capacity to store a mini-batch B formed of a subset of the training data points. The working memory 304 is further arranged to store parameters for a variational inference model including variational parameters $\hat{m}$, $\hat{S}$ and Z of a VGP q(/(•), a positive-definite matrix-valued slack parameter T, and hyperparameters of the kernel k of the VGP.

The data processing system 300 includes a sampler 312, which in the present example is implemented as program code executed by processing circuitry of the data processing system 300, though in other examples may be a hardware component such as an application specific integrated circuit (ASIC). The sampler 312 is arranged to randomly sample mini-batches of training data points from the dataset D and to transfer the randomly sampled mini-batches from the main storage 302 to the working memory 304.

The data processing system 300 includes an inference module 308, which includes processing circuitry configured to perform variational inference in accordance with the present invention. In this example, the inference module 308 includes multiple processor cores 310, of which four processor cores 310a-d are shown. In this example, the processor cores are located within an NNA, though in other examples multiple processor cores may be included for example in one or more processing units such as a graphics processing unit (GPU) or a central processing unit (CPU). In the present example, performing variational inference involves determining parameters which maximise an objective function $\mathcal{L}_{mod}$ which is a modified version of objective function $\mathcal{L}$ of Equation (4). The resulting parameters correspond to a best fit of the VGP to the dataset D. As will be explained in more detail hereafter, the modification of the objective function allows for variational inference to be performed efficiently and in a parallelized manner over multiple processing cores and/or using a distributed data processing system by removing the need to explicitly invert a covariance matrix at each training iteration.

Example Implementation for Log-Concave Likelihoods

A log-concave likelihood is one for which $d^2[\log p(y_n|/_2)]/\partial y_n^2 < 0$ for $y_n$ e E for all values n=1, ..., N. An example of a log-concave likelihood is a Gaussian likelihood, which is commonly used in regression problems and is defined as $p(y_n|f_n)=N(y_n|f_{n<>}^{J2})$. In a first embodiment of the present invention, which is valid for any model with a log-concave likelihood, the objective function of Equation (4) is modified as shown in Equation (5):

$$\mathcal{L}_{mod} = \sum_{n=1}^{N} \mathbb{E}_{N(f_n|\mu_n, \overline{\sigma}_n^2)}[\log p(y_n|f_n)] - KL[q(u)||p(u)], \quad (5)$$

with $p_n = -k_u{}^T \hat{m}$ and $\overline{\sigma}_n^2 = k_{nn} + k_u{}^T T K_{uu} k_u{}^n - 2k_u{}^T T k_u{}^n + k_u{}^T \hat{S} k_u{}^n$, where $\hat{m}$ and $\hat{S}$ are variational parameters related the mean m and covariance S of the variational distribution qr(u) respectively. In the present embodiment, the mean m of the variational distribution is related to the variational parameter in via the relation $m=K_{uu}\hat{m}$, and the covariance S of the variational distribution is related to the variational parameter $\hat{S}$ via the relation $S=K_{UU}\hat{S}K_{UU}$. By reparameterising the mean and covariance in this way, the expectation terms in the modified objective function can be computed without inverting the covariance matrix $K_{uu}$. The predictive mean $\mu_n$ is unchanged by the reparameterisation, whilst the modified predictive variance $\overline{\sigma}_n^2$ is greater than or equal to the unmodified predictive variance with equality when the slack parameter T is equal to the inverse of the covariance matrix $K_{uu}$. The modified objective function $\mathcal{L}_{mod}$ is therefore a lower bound of the unmodified objective function £, with equality when the slack parameter T is equal to the inverse of the matrix $K_{uu}$. It can be shown that introducing the slack parameter T does not introduce any additional local optima to the objective function, and therefore simultaneously optimising the variational parameters $\hat{m}$ and $\hat{S}$ and the hyperparameters of the kernel with the slack parameter T results in the modified objective function $£_{mod}$ tending towards the optimised value of the unmodified objective function £, with the VGP tending towards a solution that is equal to the solution determined using the unmodified objective function. It is stressed that although the solution determined using the present invention is the equally as good as that determined using existing approximations, the computational cost of inverting a covariance matrix at each training iteration is avoided.

As discussed above, the unmodified objective function £ contains terms corresponding to an expected log-likelihood for each data point under the predictive variance of the VGP. The modified objective function similarly contains terms corresponding to an expected log-likelihood for each data point, but this time under a Gaussian distribution with a predictive variance $\overline{\sigma}_n^2$ which is greater than the predictive variance of the VGP evaluated at the training data item, except for at the optimal value of the slack parameter T, at which point the modified predictive variance $\overline{\sigma}_n^2$ is equal to the unmodified predictive variance $\sigma_n^2$. The dashed curves in FIGS. 1 and 2 represent a single modified standard deviation above and below the mean function of the VGP, whilst the inner frames show modified normal distributions $p(/I)=N(f_4|\mu_4, \overline{\sigma}_4^2)$ corresponding to the VGP evaluated at the point $x_4$ with the overestimated variance $\overline{\sigma}_4^2$. It is observed that in FIG. 1, corresponding to an early training iteration, the modified predictive variance is significantly greater than the unmodified predictive variance. In FIG. 2, corresponding to a later training iteration, the modified predictive variance is only slightly greater than the unmodified predictive variance. Eventually, the modified predictive variance converges to the unmodified predictive variance as the slack parameter converges to the inverse $K_{uu}^{-1}$ of the covariance matrix.

In the present implementation, the slack parameter T and the variational parameter $\hat{S}$ are each decomposed using Cholesky decomposition such that $T=L_T L_T^T$ and $\hat{S}=L_{\hat{S}} L_{\hat{S}}^T$ where $L_T$ and $L_{\hat{S}}$ are real lower-triangular matrices. The number of scalar parameters in each of the matrices T and S is therefore reduced from $M^2$ to $M(M+1)/2$. Other decompositions are possible, for example a QR decomposition using Householder matrices. Using different decompositions may lead to varying performance of the optimisation procedure.

In addition to the decomposition of T, the parameterisation of the covariance S of the variational distribution qr(u) in terms of the variational parameter $\hat{S}$ is not unique. Different parameterisations lead to different optimisation surfaces, which in some examples may improve the convergence properties of the objective function during training. In one embodiment, the covariance is parameterised using the slack parameter T as a preconditioner to give $S=K_{UU}T\hat{S}TK_{UU}$, leading to a different modified predictive variance $\bar{\sigma}_n^2$ given by $\bar{\sigma}_n^2=k_{nn}+k_{un}^T TK_{uu}k_u^n-2k_{un}^T Tk_{*}^n+k^\wedge TSTk^\wedge$. In this embodiment the variational parameter $\hat{S}$ is equal to the covariance S at the optimal value of the slack parameter T. It is therefore expected that near the optimum, the dependence of the modified objective function on S will approximate the dependence of the unmodified objective function on S, resulting in similar convergence properties near this point. Numerical experiments have shown that in certain examples, optimisation is more efficient using this alternative parameterisation. It will be appreciated that other parameterisations are possible without departing from the scope of the invention.

Example Implementation for General Likelihoods

The modified objective function $\mathcal{L}_{mod}$ described above is only guaranteed to be a lower bound of the unmodified objective function £ for GP models with log-concave likelihoods. Furthermore, the difference between the modified objective function and the marginal likelihood is not equal to the KL divergence between the VGP and the Bayesian posterior (analogous to Equation (3) for the unmodified objective function) and therefore the modified objective function cannot be considered a variational bound in the strict sense. In the present section, a further embodiment is presented which is valid for any likelihood and for which the objective function is a variational bound in the strict sense. For this embodiment, the modified predictive variance $\bar{\sigma}_n^2$ is the same as before, but the covariance S of the variational distribution qr(u) is given by Equation (6):

$$S=K+K_{uu}+K_{UU}TK_{UU}TK_{UU}-2K_{UU}TK_{UU}+K_{UU}\hat{S}K_{UU}. \quad (6)$$

Unlike the embodiments described above, in which the modified objective function £$_{mod}$ is a lower bound of the unmodified objective function £, in the present embodiment, the modified objective function £$_{mod}$ is exactly equivalent to the unmodified objective function £ for a particular choice of parameters. In effect, the modification to the expected log-likelihood terms in £ mod is exactly cancelled out by a modified KL penalization term, such that Equation (3) holds for £$_m$ $_o$d and accordingly £$_m$ $_o$d is a variational bound in the strict sense. Further embodiments can be realised by replacing S (consistently) in the expressions for the modified predictive variance $\bar{\sigma}_n^2$ and the covariance S. For example, if the alternative expression $\bar{\sigma}_n^2$ is used for the modified predictive variance, £$_{mod}$d is a strict variational bound when the covariance S is given by Equation (7):

$$S=K_{uu}+K^\wedge TK^\wedge TK^{TM}-2K_{UU}TK_{uu}+K ,,, T\hat{S}TK_{ub} . \quad (7)$$

Estimators for KL Term

Each of the example methods described above removes the inverse covariance matrix $K_{uu}^{-1}$ from the expectation terms in $\mathcal{L}_{mod}$, resulting in the computational cost of evaluating the expectation terms (and the gradients of the expectation terms) being reduced to $O(BM^2)$. The remaining term in £$_{mod}$ is a KL divergence between two Gaussian distributions, and accordingly is known in closed form. However, the gradient of the KL term contains components with an $O(M^3)$ computational cost, and hence results in a further computational bottleneck in the training procedure. In order to perform gradient-based optimisation, it is necessary to determine the gradient of the KL term with respect to the parameters of the VGP model, or otherwise to determine an unbiased stochastic estimator for the gradient of the KL term. In some embodiments, an unbiased stochastic estimator for the gradient of the KL term is determined using random probe vectors. Using random probe vectors removes the $O(M^3)$ computational cost by replacing matrix-matrix multiplications with a series of matrix-vector multiplications, as will be described in more detail hereafter.

The KL term in Equation (5) has a closed-form expression given by Equation (8):

$$KL[qr(u)\|p(u)] = \frac{1}{2}\left(Tr(K_{uu}^{-1}S) + m^T K_{uu}^{-1}m - M + \log\left(\frac{\det I_{uu}}{\det S}\right)\right). \quad (8)$$

By substituting the reparameterised expressions for S and m, the inverses of the covariance matrix are removed from Equation (8). However, the gradients of the trace and log-determinant terms still have a computational cost of $O(M^3)$. More specifically, the trace includes terms of the form $Tr(K_{uu}M_j \ldots My)$ where each My for j=1 . . . ] is an M×M square matrix. Each matrix-matrix product in these trace terms contributes an $O(M^3)$ computational cost. However, unbiased stochastic estimators for these terms can be determined using Hutchinson's trace estimator, as shown by Equation (9):

$$Tr(K_{uu}M_1 \ldots M_K) \approx \frac{1}{H}\sum_{i=1}^{H} r_i^T K_{uu}M_1 \ldots M_K r_i, \quad (9)$$

where each of the one or more random probe vectors $1'_i \sim p(r)$ is sampled from a distribution with zero mean and unit variance such that $E[r_i]=0$ and $\mathbb{E}[r_i r_i^T]=I$. Examples of such distributions are the normalised Gaussian distribution and the Rademacher distribution. By performing the multiplications in Equation (9) from left to right or from right to left, only matrix-vector multiplications are required (as opposed to matrix-matrix multiplications), resulting in an $0(HM^{2'})$ computational cost. The gradient of this stochastic estimator is determined using reverse-mode differentiation, which also has an $0(HM^{2'})$ computational cost.

After substituting the reparameterised expression for S into Equation (8), a log-determinant term remains in the form log det A for a square M×M matrix A. Reverse-mode differentiation of this term requires computation of the partial derivative $d[\log \det A]/dA=A^{-1}$. An unbiased estimator for this term is given by $\Sigma_{j=1}^J A^{-1}p_j pJ$, where each of the one or more random probe vectors $p_j$ is sampled from a distribution with zero mean and unit variance such that $E[P_j]=0$ and $E[p_j p_j^T]=I$. An unbiased estimator $\hat{S}j$ of the quantity $Sj=A^{-1}p_j$ is given by a randomly truncated conjugate gradient sum, as shown in Equation (9):

$$\hat{s}_j = \sum_{i=1}^{I_j} w_{ij} s_{ij}, \quad (10)$$

where $s_{ij}$ is the $i^{th}$ term in the conjugate gradient expansion for $s_j$, the number of terms $I_j \sim p(i)$ is random and independent of the random probe vector $p_j$, and the weights $w_j$ are chosen such that $\mathbb{E}_{I_j}[sj]=Sj$. An unbiased estimator for $A^{-1}$ is then given by Equation (11):

$$A^{-1} \approx \sum_{j=1}^{J} \hat{s}_j p_j^T, \quad (11)$$

which has a computational cost of $O(J\bar{I}M^2)$, where $\bar{I}=\mathbb{E}[I_j]$. Using the unbiased estimators of Equations (9) and (11) avoids the computation of any terms of $O(M^3)$ computational cost in the reverse-mode derivative of the KL term. It is noted that variants of the method described above may be used without departing from the scope of the invention, for example using preconditioning matrices to reduce the variance of the estimator in Equation (11). In an example where $S=K_{uu}\hat{S}K_{UU}$, the matrix A is equal to the covariance matrix $K_{uu}$ and writing the quantity $K_{u,v}^{-1}p_j$ as $L_T$ $(L_T K_{uu} L_T)^{-1} L_T^T p_j$ results in faster convergence of the conjugate gradient sum, reducing the variance of the estimator of Equation (10) for a given number of terms, allowing a distribution p(i) with a lower expectation to be used.

It is noted that the method described above is not the only way of approximating the KL term in Equation (5). For example, alternative estimators for the terms in Equation (10) can be determined using a truncated Chebyshev polynomial approximation of the logarithm function. Further methods of approximating the KL term are envisaged and may be used without departing from the scope of the invention.

Example Method

Figure 4:
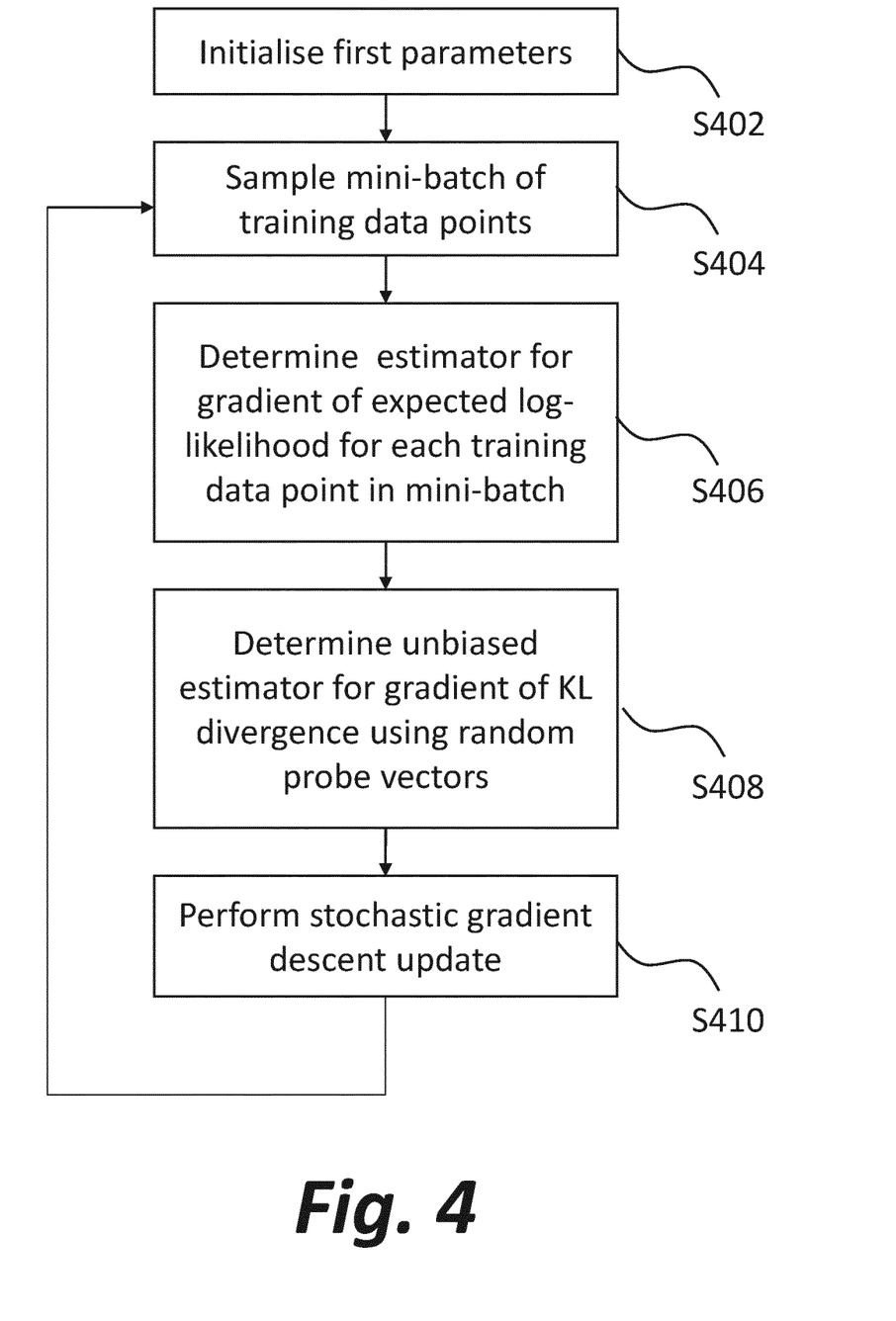
FIG. 4 shows a data processing system arranged in accordance with an embodiment of the present invention.

FIG. 4 shows an example of a method performed by the data processing system of FIG. 3 to train a VPG in accordance with an embodiment of the present invention. The present method is compatible with any of the implementations described above. Prior to the method being carried out, the dataset D is stored in the main storage 302. The data processing system initializes, at S402, first parameters including variational parameters $\hat{m}$, $\hat{S}$ and Z of the VGP, the positive-definite matrix-valued slack parameter T, and hyperparameters of the kernel k. In the present example, the first parameters are initialized randomly, though other strategies may be employed, for example using K-means clustering to initialize the inducing inputs Z.

The sampler 306 randomly samples, at S404, a mini-batch B of training data points from the dataset 316, where $|B|\ll N$, and transfers the sampled mini-batch from the main storage 302 to the working memory 404. The inference model 308 determines, at S406, an unbiased estimator for the gradient of the expected log-likelihood for each training data point in the mini-batch under a latent Gaussian distribution with mean $\mu_n$ and variance $<\!\!\sqrt[3]{4}$. In examples where the expectation term is intractable, an unbiased stochastic estimator is determined, for example using one or more Monte Carlo samples as shown in Equation (12)

$$\frac{\partial}{\partial \theta_i}\mathbb{E}_{N(\mu_n,\sigma_n^2)}[\log p(y_n|f_n)] \approx \frac{1}{S}\sum_{s=1}^{S}\frac{\partial}{\partial \theta_i}\log p(y_n|f_n^{(s)}), \quad (12)$$

where $f_n^{(s)} \sim N(\mu_n, \bar{\sigma}_n^2)$, and $\theta = \{\theta_i\}_{i=1}^{P}$ is the set of parameters to be optimised including the slack parameter T. In practice, samples of a random variable $\in_n^{(s)}$ are drawn from a normalised Gaussian distribution $iV(0,1)$ and the sampled $f_l^{(s)}$ is determined as $f_l^{(s)}=\mu_n+\bar{\sigma}_n\in_n^{(s)}$ (this is sometimes referred to as the reparameterisation trick). Reverse mode differentiation is used to determine the gradient. For examples in which the expectation terms are tractable, Monte Carlo sampling is unnecessary. In the present example, computation or estimation of the gradient of the expectation terms is parallelized across the processor cores 310 and performed using single-precision arithmetic, both of which are made possible by the removal of the matrix inversion in the expressions for $\mu_n$ and $\sigma_n$. In particular, the predictive variance $\bar{\sigma}_n$ is computed by performing vector-matrix products using single precision arithmetic, as opposed to double precision arithmetic which is typically used for computing inverses of large matrices. In other examples, other reduced-precision floating point number formats (having a lower precision that double precision) or fixed-point number formats may be used. The removal of the matrix inversion from the computation allows for lower precision number formats to be used, increasing the speed of the computation, without seriously compromising the accuracy of the result. We refer to arithmetic computations using reduced-precision floating point number formats or fixed-point number formats as reduced-precision arithmetic.

The inference module determines, at S408, an unbiased estimator for the gradient of the KL divergence term in Equation (5). In this example, random probe vectors are used as described above.

Having determined gradient estimators for the expectation terms and the KL term in $\mathcal{L}_{mod}$, the inference module performs, at S410, a stochastic gradient descent update using the determined gradient estimators. The gradient descent/ascent update is given by $\theta \rightarrow \theta \pm \eta_t \tilde{\nabla}_\theta \mathcal{L}_{mod}$, where $\tilde{\nabla}_\theta$ is an unbiased stochastic estimator for the gradient formed from the estimators determined at S406 and S408. The plus sign corresponds to stochastic gradient ascent, whereas the minus sign corresponds to stochastic gradient descent. The parameter $\eta_t$ is predetermined at each iteration t, and may be a scalar or otherwise may include a preconditioning matrix depending on which specific variant of stochastic gradient descent is used. Examples of variants of stochastic gradient descent are Adam and Limited-Memory Broyden-Fletcher-Goldfarb-Shanno (L-BFGS). The updated parameters are stored in working memory 304.

The method of FIG. 4 is performed iteratively until either predetermined convergence criteria are satisfied or until a predetermined number of iterations have been performed. The resulting set of parameters may then be transferred to the main storage 302 or may remain in the working memory 304 to be used in further computations, for example to determine a predictive distribution over an unknown output y* for a given input x*.

Application to DGPs

The expressive capacity of a given single-layer GP model is limited by the choice of kernel function. Extending a GP model to having a deep structure can further improve the expressive capacity. In an example, a deep GP architecture is based on a composition of functions $f(\bullet)=f(\ldots,f_2(f_1(\bullet)))$, where each component function $f$ is given a GP prior such that $f_l \sim GP(\mu_l(\bullet), k_l(\bullet,\bullet'))$, where $\mu_l$ is a mean function and $k_l$ is a kernel. The functions $f_l: \mathbb{R}^{d_{l-1}} \rightarrow \mathbb{R}^{d_l}$ for $l=1,\ldots,L-1$ are hidden layers of the deep GP, whereas the function $f_l: \mathbb{R}^{d_{L-1}} \rightarrow \mathbb{R}^{d_L}$ is the output layer of the deep GP (the outputs of the hidden layers and the output layer may be scalar- or vector-valued). The joint density for the deep GP model is given by Equation (13):

$$p(\{y_n\}, \{h_{n,l}\}, \{f_l(\cdot)\}) = \prod_{n=1}^{N} p(y_n | h_{n,L}) \prod_{l=1}^{L} p(h_{n,l} | f_l(h_{n,l-1})) p(f_l(\cdot)), \quad (13)$$

in which $h_{n,0} = x_n$ and the (predetermined) form of $p(h_{n,l}|f_l(h_{n,l-1}))$ determines how the output $h_{n,l}$ of a given GP layer depends on the output of the response function for that layer, and may be chosen to be stochastic or deterministic. In a specific deterministic example, the output of the layer is equal to the output of the response function, such that $p(h_{n,l}|f:(h_{n,l-1})) = \delta(h_{n,l} - f_l(h_{n,l-1}))$.

In the present example, each layer of the deep GP is approximated by a variational GP $q(f_i)$ with marginals specified at a respective set $Z^l$ of inducing inputs $Z^l = (z_1^l, \ldots z_{M_l}^l)^T$, where the inducing inputs may be placed in the same domain as the input $h_{n,l-1}$ for that layer, or may be placed in a different domain, resulting in so-called inter-domain inducing inputs. The outputs of the component function $f$ at the inducing inputs are inducing variables $u_l = f_l(Z^{l-1})$, which inherit multivariate Gaussian distributions $q(u_l) = N(U_l | \ln q, S_l)$ from the variational GP layers $q(f_i)$.

In the accordance with the present invention, a modified objective function for the variational DGP is given by Equation (14):

$$\mathcal{L}_{mod}^{DGP} = \sum_{n=1}^{N} \mathbb{E}_{\bar{q}(\{h_{nl}\},\{f_l(\cdot)\})}[\log p(y_n|h_{n,L})] - \sum_{l=1}^{L} KL[q(u_l)\|p(u_l)]. \quad (14)$$

The objective function is estimated using mini-batches B of size $|B| \ll N$. The modified posterior density appearing in Equation (14) is given by $\bar{q}(\{h_{n,l}\}, \{f_l(\cdot)\}) = \prod_{n=1}^{N} \prod_{l=1}^{L} p(h_{n,l}|f_l(h_{n,l-1}))\bar{q}(f_l(\cdot))$, with the modified density $\bar{q}(f_i(\cdot))$ for each layer given by Equations (15)-(17):

$$\bar{q}(f_l(h_{n,l-1})) = \mathcal{N}(f_l(h_{n,l-1})|\bar{\mu}_l, \bar{\Sigma}_l), \quad (15)$$

where $$[\bar{\mu}_l]_n = k_l(Z^{l-1}, h_{n,l-1})^T \hat{m}_l, \quad (16)$$

and $$[\bar{\Sigma}_l]_{nm} = k_l(h_{n,l-1}, h_{m,l-1}) + k_l(Z^{l-1}, h_{n,l-1})^T (T_l k_l(Z^{l-1}, Z^{l-1}) - 2T_l + \hat{S}_l) k_l(Z^{l-1}, h_{n,l-1}), \quad (17)$$

with $m_l = k_l(Z^{l-1}, Z^{l-1})\bar{m}_l$ and $S_l = k_l(Z^{l-1}, Z^{l-1})$. In the DGP example, $T_l$ is a positive-definite matrix-valued slack parameter for the $Z^{th}$ layer and is to be optimised along with $\hat{m}_l$, $\hat{S}_l$ and $Z^l$ for $l=1 \ldots, L$. In other words, the same substitutions described above for the single-layer GP example are made within each layer of the DGP. Furthermore, all of the variants of the method described above apply for each layer within the DGP.

To overcome the intractability of the expectation terms in Equation (14), Monte Carlo samples are drawn from the distributions $\bar{q}(\{h_{n,l}\}, \{f_l(\cdot)\})$. This is achieved using the reparameterisation trick mentioned above, where in this case a random variable $e_n^{\circledR}$ is sampled from a normalised Gaussian distribution $e_n^{\circledR} \sim \mathcal{N}(0, I_{d_l})$, then the random variables $h_{n,l}$ are evaluated using the sampled random variables and the iterative relation $$h_{n,l} = \left[ \bar{\mu}_l \right]_n + e_n^{\circledR} \circ \sqrt{\left[\bar{\Sigma}_l\right]_{nn}},$$

in which the square root and the product are taken element-wise. In this way, a stochastic estimator for the modified objective function is determined at each gradient ascent step, and reverse mode differentiation is used to determine a stochastic estimate for the gradient of the objective function. Due to the removal of the matrix inversion at each layer in the DGP, the evaluation of the modified objective function is performed at a relatively low computational cost and can be parallelized efficiently, allowing for scalable variational inference.

Figure 5:
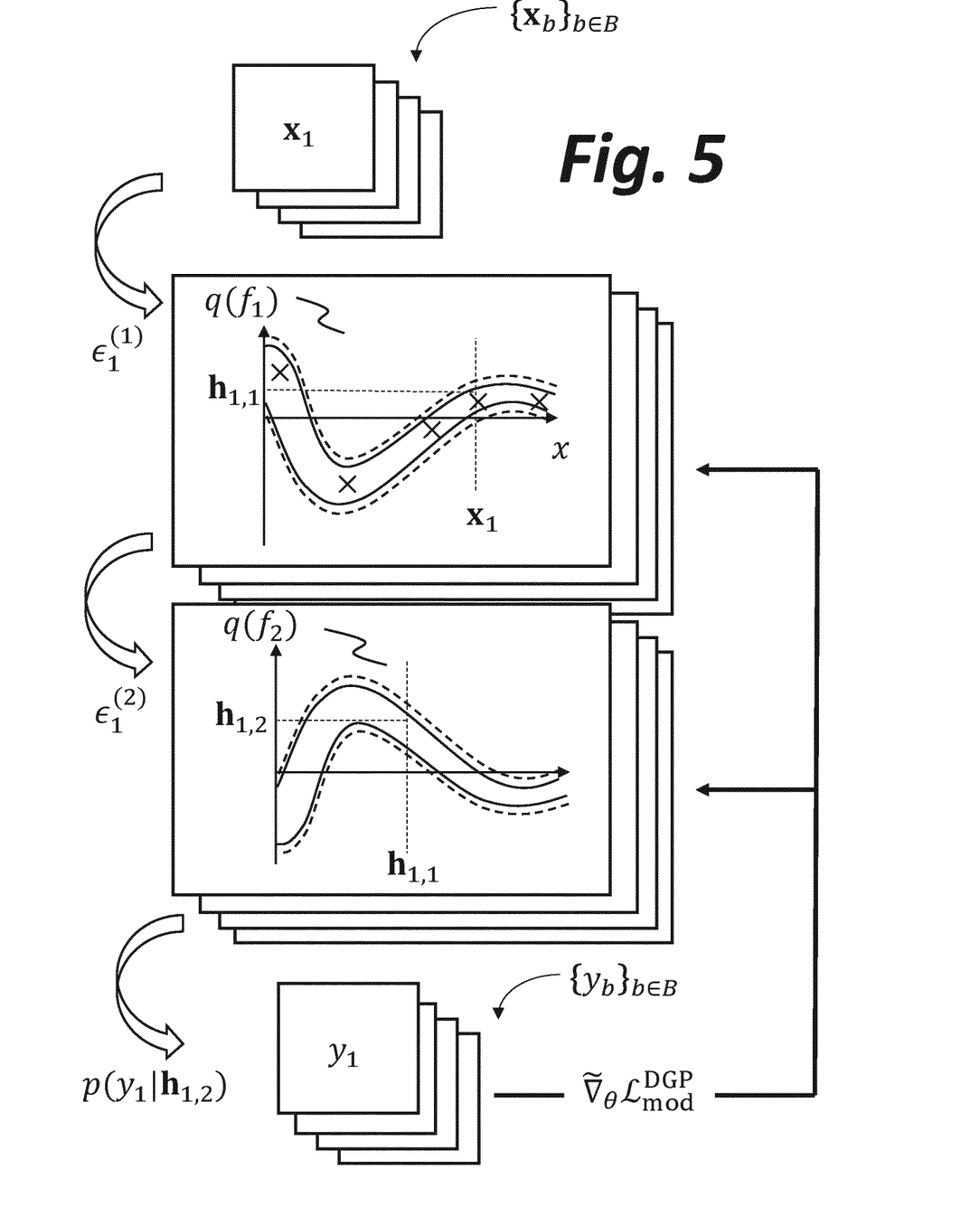
FIG. 5 shows schematically a variational deep Gaussian process (DGP) model being trained to fit a set of observed training data.

FIG. 5 schematically shows a training phase performed by a data processing system with multiple processor cores (for example including an NNA) for a two-layer DGP model (L=2) in a regression setting. Each training data point in a large dataset D is formed of an input data portion $x_i$, and an output data portion $y_n$. At a given training iteration, a mini-batch B of training data points is sampled from the dataset and each of the training data points is allocated to a respective processor core (with some data points possibly being allocated to the same processor core). For each data point in the mini-batch, the allocated processor core performs a sequence of operations to determine a respective component of the gradient estimator $\tilde{\nabla}_\theta \mathcal{L}_{mod}^{DGP}$. More specifically, a first random variable $e_b^{(1)}$ is drawn from a normalised multivariate Gaussian distribution, and a vector $h_{b,l}$ is determined using the relation $$h_{b,l} = \left[\bar{\mu}_1\right]_b + e_b^{(1)} \circ \sqrt{\left[\bar{\Sigma}_1\right]_{bb}},$$

which is determined without inversion of the covariance matrix $k_1(Z^{\circ}, Z^{\circ})$ in accordance with the present invention. A second random variable $e_b^{(2)}$ is then drawn from the normalised multivariate Gaussian distribution, and a vector $h_{b,2}$ is determined using the relation $h_{b,2} = [\bar{\mu}_2]_b + \in_b^{(2)} \circ \sqrt{[\bar{\Sigma}_2]_{bb}}$, which is determined without inversion of the covariance matrix $k_2(Z^1, Z^1)$ in accordance with the present invention. The likelihood $p(y_b|h_{b,2})$ is then evaluated at the vector $h_{b,2}$, and the logarithm of this likelihood is used as a Monte Carlo estimate of the expectation value appearing in Equation (9). Reverse-mode differentiation is performed to determine the respective component of the gradient estimator $\tilde{\nabla}_\theta \mathcal{L}_{mod}^{\circ GP}$. An unbiased estimator for the gradient of each KL term in Equation (14) is determined using random probe vectors as described above, and a stochastic gradient ascent step is performed using the resulting gradient estimator $\tilde{\nabla}_\theta \mathcal{L}_{mod}^{DGP}$. This procedure is performed iteratively until predetermined convergence criteria have been satisfied or until a predetermined number of iterations have been performed.

The GP and DGP models described above are applicable in a range of technical settings. In a regression setting, the dependent variable $y_n$ corresponds to a scalar or vector quantity representing an attribute of the data. Regression problems arise, for example, in engineering applications, weather forecasting, climate modelling, disease modelling, medical diagnosis, time-series modelling, and a broad range of other applications.

In addition to regression problems, the GP and DGP models described above are applicable to classification problems, in which case $y_n$ represents probabilities associated with various respective classes. Within a given training dataset, a class vector $y_n$ may therefore have a single entry of 1 corresponding to the known class of the data item $x_n$, with every other entry being 0. In the example of image classification, the vector x has entries representing pixel values of an image. Image classification has a broad range of applications. For example, optical character recognition (OCR) is based on image classification in which the classes correspond to symbols such as alphanumeric symbols and/or symbols from other alphabets such as the Greek or Russian alphabets, or logograms such as Chinese characters or Japanese kanji Image classification is further used in facial recognition for applications such as biometric security and automatic tagging of photographs online, in image organisation, in keyword generation for online images, in object detection in autonomous vehicles or vehicles with advanced driver assistance systems (ADAS), in robotics applications, and in medical applications in which symptoms appearing in a medical image such as a magnetic resonance imaging (MRI) scan or an ultrasound image are classified to assist in diagnosis.

In addition to image classification, GPs and DGPs may be used in classification tasks for other types of data, such as audio data, time-series data, or any other suitable form of data. Depending on the type of data, specialised kernels may be used, for example kernels exhibiting a convolutional structure in the case of image data, or kernels exhibiting periodicity in the case of periodic time-series data.

Application in Reinforcement Learning Subsystem

Figure 6:
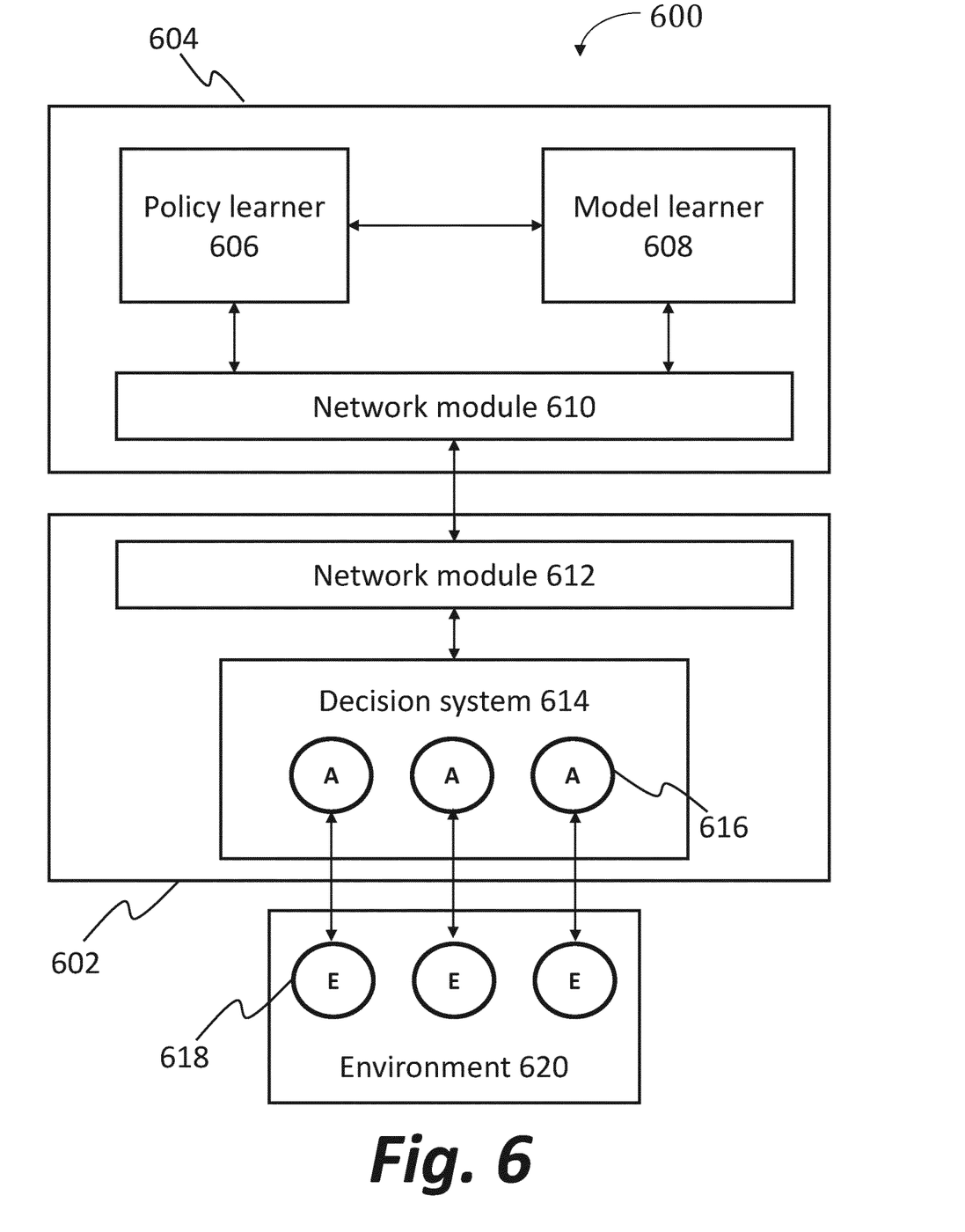
FIG. 6 shows a reinforcement learning subsystem incorporating an embodiment of the present invention.

FIG. 6 shows a reinforcement learning system 600 which incorporates an embodiment of the present invention. The system 600 includes a client subsystem 602 and a learning subsystem 604, and data is transferred between the client subsystem 602 and the learning subsystem 604 via a first network module 610 and a second network module 612. In the present example, the learning subsystem 604 is a distributed cloud-based server system, and interacts with the client subsystem 602 using an Application Programming Interface (API). In the present example, the reinforcement learning system 600 is used to manage a fleet of taxis in a city. The client subsystem 602 is operated by the taxi fleet operator, whereas the learning subsystem 604 is operated by a service provider.

The client subsystem 602 includes a decision system 614 comprising N agents, collectively referred to as agents 616, of which three are shown for ease of illustration. The agents 616 are associated with entities 618 that interact with a physical environment 620. The agents 616 receive observation signals from the entities corresponding to observations of states of the environment 620, and generate action signals in dependence on the received observation signals in accordance with one or more policies. The agents 616 also receive rewards depending on the outcomes of the actions performed. Policies may be deterministic or stochastic, and can generally be viewed as parameterised mappings from state observations to actions. In the present example, a state observation offers only a partial description of the environment 618 (as is typically the case of physical environments), though in other examples a state observation may correspond to a complete description of a state of an environment (as is typically the case for a virtual environment such as in a video game). In the present example, the action signals generated by the agents 616 also depend on probabilistic model data generated by the model learner 608. The model data includes parameters of a GP model which provides probabilistic information about future states of the environment 618.

The learning subsystem 602 includes a policy learner 606 and a model learner 608. The policy learner 606 receives experience data corresponding to sequences of state observations, actions and rewards experienced by the agents 616. The policy learner 606 processes the experience data using reinforcement learning to generate policy data for the agents 616. The model learner 608 processes model input data using variational inference to determine parameters of a probabilistic GP model associated with the environment 620. Model input data may include, for example, historical data, state observation data received from the entities 618, and/or data indicative of measurements taken by sensors in the environment 620.

In the present example, the entities 618 are taxis and the environment 618 corresponds to a city. The observation signals include locations of taxi requests in the city, and the action signals include instructions for drivers of the taxis. The GP model in this example predicts rates of taxi requests as a function of time and location in the city, and is determined using a variational Cox process model as described in European patent publication EP3467718. A periodic or quasi-periodic kernel may be used to ensure the model captures periodic temporal variation, for example due to time of day, time of week, and/or time of year.

In the present example, the environment 620 is dynamic and accordingly may change over time. The GP model generated by the model learner 608 may therefore be occasionally or frequently updated to ensure that the agents 616 make decisions based on up to date information. It is desirable to use a large number of data points to train the model, and therefore conventional VGP methods will suffer due to the computational bottleneck described above. By contrast, the novel methods described above allow for efficient learning of the GP model parameters and furthermore allow for parallelization of the model training process across the learning subsystem 604. In this way, the present invention facilitates the incorporation of GP-based probabilistic modelling into a reinforcement learning setting.

Processing Unit

Figure 7:
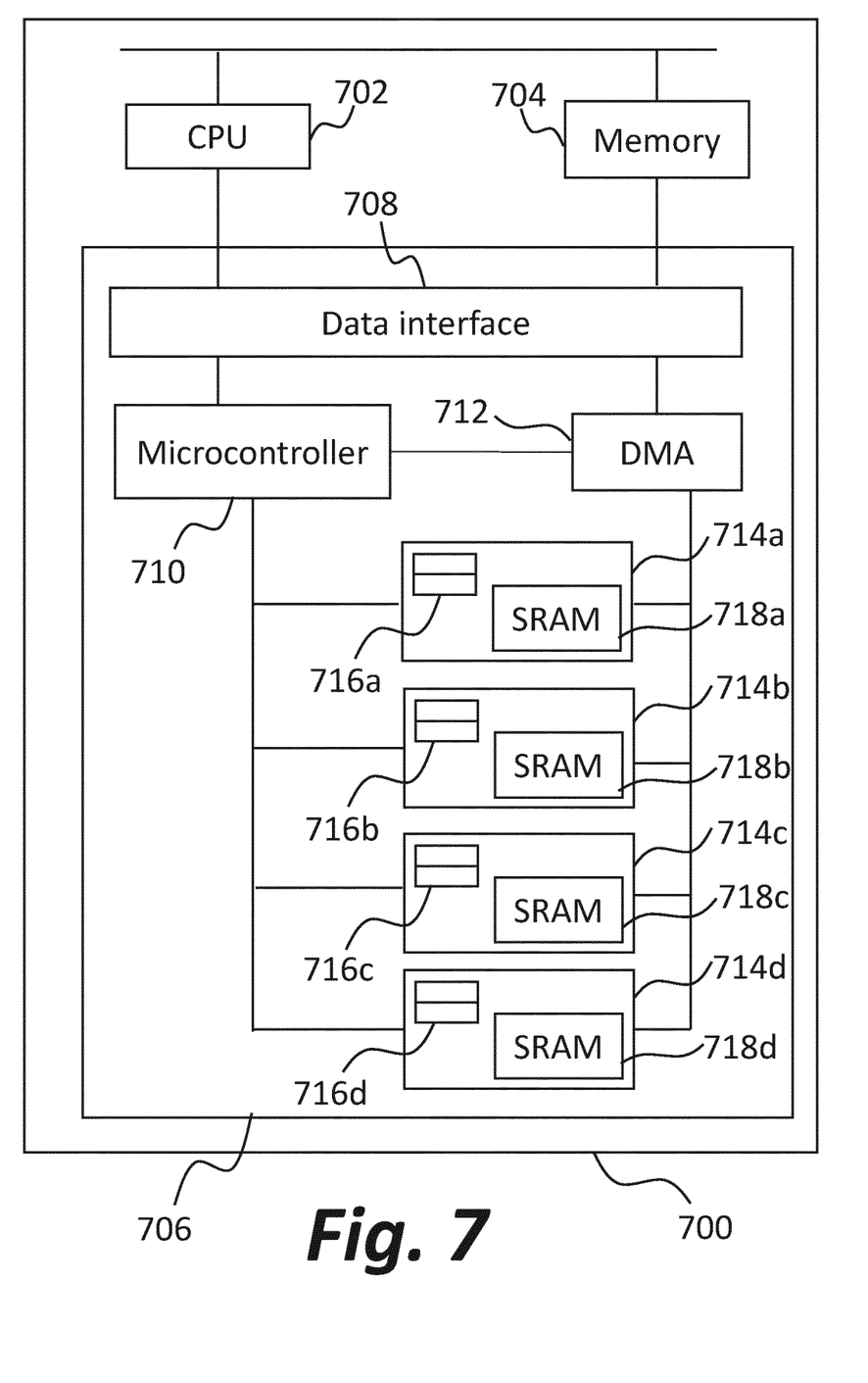
FIG. 7 shows a computing system comprising a processing unit arranged in accordance with an embodiment of the present invention.

FIG. 7 shows a computing system 700. The computing system 700 includes a CPU 702 and memory 704. The memory 704 in this example is volatile working memory including DRAM. The computing system 700 includes various additional components not shown in FIG. 7, such as permanent storage, input/output devices, network interfaces, and the like. The computing system 700 also includes a specialist processing unit 706 configured to perform sparse variational inference in accordance with the present invention. In this example, the processing unit 706 is an integrated circuit which is integral to the computing system 700. In other examples, a processing unit may be removable from a computing system. The processing unit 706 in this example is an application-specific standard product (ASSP). Alternatively, the processing unit 706 could be replaced with another type of integrated circuit such as an application-specific integrated circuit (ASIC) or a field-programmable gate array (FPGA).

The processing unit 706 includes a data interface 708 via which the processing unit 706 can exchange data, including control data, with the CPU 702 and the memory 704. The processing unit 706 further includes a microcontroller 710 for controlling processing operations performed by the processing unit 706. A microcontroller is a compact integrated circuit designed to govern a specific set of operations in an embedded system. The microcontroller 710 in this example includes a processor and memory, including control registers and a small amount of RAM. The processing unit 706 further includes multiple processing nodes 714 (of which four, 714a-b, are shown), also referred to as compute engines or processor cores, each including a respective set of control registers 716, respective SRAM 718, and respective processing circuitry arranged to process data stored in the respective SRAM 718 in accordance with control data stored in the respective set of control registers 716. The microcontroller 710 is arranged to overwrite the control data stored by the processing nodes 714 during processing, such that the processing nodes 714 are configured to perform different processing operations at different stages of the training.

The processing unit 706 further includes a direct memory access (DMA) unit 712 arranged to exchange data transfer data between the memory 704 of the computing system 700 and the SRAM of the processing nodes 714, under instruction from the microcontroller 710. The data exchanged by the DMA 712 includes, for example, training data items from a training dataset $\{(x_n, y_n)\}_{n=1}^N$, trainable parameter values for a sparse variational GP, and intermediate values stored at training or test time.

During the training of a sparse variational GP in accordance with the present disclosure, each of the processing nodes 714 is configured to perform operations independently of the other processing nodes 714. In particular, the control unit is arranged to allocate each training data item to a respective one of the processing nodes 714, and the processing node is configured to determine a gradient estimator for an expected log-likelihood of the training data item under a Gaussian distribution with a predictive variance $\bar{\sigma}_n^2$ depending on a slack parameter T as discussed above. In this way, the determination of gradient estimators for updating the parameters of the VGP is parallelized across the processing nodes 714 without the need for the processing unit 706 to invert a covariance matrix.

The above embodiments are to be understood as illustrative examples of the invention. Further embodiments of the invention are envisaged. For example, although the method of FIG. 4 is described as being performed by specific components of a data processing system, in other embodiments the functions of the various components may be implemented by different components, for example within processing circuitry and memory circuitry of a general-purpose computer. Alternatively, the functions may be implemented using a distributed computer system. Similarly, alternative arrangements are possible for a reinforcement learning subsystem, for example in which all of the functions of the system 600 are performed by a single computer. It will be appreciated that reinforcement learning subsystems of the type described above are not limited to fleet management systems, but may be used for a wide range of applications, such as in logistics or finance.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A system comprising:
    processing circuitry comprising a plurality of processor cores; and
    memory circuitry storing machine-readable instructions which, when executed by the processing circuitry, cause the system to process training data comprising a set of training data items to train a machine-learning model comprising a Gaussian process (GP) model for modelling the training data items, the GP model comprising a variational Gaussian process (VGP) corresponding to a GP prior conditioned and marginalised with respect to a set of randomly-distributed inducing variables, the processing comprising determining parameters of the GP model by:
    initializing first parameters of the VGP including a positive definite matrix-valued slack parameter; and
    iteratively modifying the first parameters to increase or decrease an objective function comprising an expected log-likelihood for each of at least a subset of the training data items under a respective Gaussian distribution with a predictive variance depending on the slack parameter,
    wherein at each iteration modifying the first parameters comprises:
        for each training data item of the at least subset of the training data items, determining a respective gradient estimator for the expected log-likelihood using a respective one of the plurality of processor cores; and
        modifying the first parameters in dependence on the determined gradient estimators, wherein at a target value of the slack parameter:
            the slack parameter is equal to an inverse of a covariance matrix for the set of inducing variables; and
            the objective function corresponds to a variational lower bound of a marginal log-likelihood for a posterior distribution corresponding to the GP prior conditioned on the at least subset of the training data items.

2. The system of claim 1, wherein the machine-readable instructions cause the system to perform said iteratively modifying the first parameters until predetermined stopping criteria are satisfied.

3. The system of claim 1, wherein for each training data item of the at least subset of the training data items, determining the respective gradient estimator comprises determining the predictive variance of the respective Gaussian distribution using reduced-precision arithmetic.

4. The system of claim 1, comprising a neural network accelerator (NNA), wherein the plurality of processor cores are components of the NNA.

5. The system of claim 1, being a processing unit for use in a host computing system, the system further comprising a data interface configured to read the training data from memory of the host computing system and to write the determined parameters of the GP model to memory of the host computing system.

6. The system of claim 5, being any one of an application-specific standard product (ASSP) an application-specific integrated circuit (ASIC) or a field-programmable gate array (FPGA).

7. The system of claim 1, wherein:
    each training data item comprises an input portion and an output portion, the output portion corresponding to one or more attributes of the input portion; and
    the GP model is a regression model.

8. A computer-implemented method of processing training data comprising a set of training data items to train a machine-learning model comprising a Gaussian process (GP) model for modelling the training data items, the GP model comprising a variational Gaussian process (VGP) corresponding to a GP prior conditioned and marginalised with respect to a set of randomly-distributed inducing variables, the method comprising determining parameters of the GP model by:
   initialising first parameters of the GP model, the first parameters including a positive-definite matrix-valued slack parameter; and
   iteratively modifying the first parameters to increase or decrease an objective function comprising an expected log-likelihood for each training data item of at least a subset of the training data items under a respective Gaussian distribution with a predictive variance depending on the slack parameter,
   wherein at each iteration modifying the first parameters comprises:
      for each training data item of the at least subset of the training data items, determining a respective gradient estimator for the expected log-likelihood; and
      modifying the first parameters in dependence on the determined gradient estimators,
   wherein at a target value of the slack parameter:
      the slack parameter is equal to an inverse of a covariance matrix for the set of inducing variables; and
      the objective function corresponds to a variational lower bound of a marginal log-likelihood for a posterior distribution corresponding to the GP prior conditioned on the at least subset of the training data items.

9. The computer-implemented method of claim 8, wherein for each training data item, the respective gradient estimator for the expected log-likelihood is determined using a respective one of a plurality of processor cores.

10. The computer-implemented method of claim 8, wherein the predictive variance of the respective latent Gaussian distribution for the $n^{th}$ training data item is equal to $\bar{\sigma}_n^2$, wherein:

$$\bar{\sigma}_n^2 = k_{nn} - k_{un}^T TK_{uu} TK_{un} - 2k_{un}^T Tk_{un} + k_{un}^T \hat{S} K_{un};$$

$k_{nn}$ corresponds to a kernel of the GP prior evaluated at the training data item;
$k_{un}$ corresponds to the kernel of the GP prior evaluated between the set of inducing variables and the training data item;
$K_{uu}$ is the covariance matrix for the set of inducing variables and corresponds to the kernel of the GP prior evaluated at the set of inducing variables;
$\hat{S}$ is a variational parameter depending on the covariance S of the VGP evaluated at the inducing inputs;
T is the slack parameter; and
at said target value of the slack parameter:
   the slack parameter T is equal to $K_{uu}^{-1}$; and
   the covariance S of the VGP evaluated at the inducing inputs is equal to $K_{uu} \hat{S} K_{uu}$.

11. The computer-implemented method of claim 10, wherein the covariance S of the VGP evaluated at the inducing inputs is equal to $$S = K_{uu} + K_{uu} TK_{uu} TK_{uu} - 2K_{uu} TK_{uu} + K_{uu} \hat{S} K_{uu}.$$

12. The computer-implemented method of claim 8, wherein the predictive variance of the respective latent Gaussian distribution for the $n^{th}$ training data item is equal to $\bar{\sigma}_n^2$ wherein:

$$\bar{\sigma}_n^2 = k_{nn} + k_{un}^T TK_{uu} TK_{un} - 2k_{un}^T Tk_{un} + k_{un}^T \hat{S} TK_{un};$$

$k_{nn}$ corresponds to a kernel of the GP prior evaluated at the training data item;
$k_{un}$ corresponds to the kernel of the GP prior evaluated between the set of inducing variables and the training data item;
$K_{uu}$ is the covariance matrix for the set of inducing variables and corresponds to the kernel of the GP prior evaluated at the set of inducing variables;
$\hat{S}$ is a variational parameter depending on the covariance S of the VGP evaluated at the inducing inputs;
T is the slack parameter; and
at said target value of the slack parameter:
   the slack parameter T is equal to by $K_{uu}^{-1}$; and
   the covariance S of the VGP evaluated at the inducing inputs is equal to the variational parameter $\hat{S}$.

13. The computer-implemented method of claim 12, wherein the covariance S of the VGP evaluated at the inducing inputs is equal to $$S = K_{uu} + K_{uu} TK_{uu} TK_{uu} - 2K_{uu} TK_{uu} + K_{uu} T\hat{S} TK_{uu}.$$

14. The computer-implemented method of claim 8, wherein:
   the objective function further comprises a Kullback-Leibler divergence between the VGP evaluated at the inducing inputs and the GP prior evaluated at the inducing inputs; and
   iteratively modifying the first parameters comprises determining an unbiased stochastic estimator for the gradient of said Kullback-Leibler divergence using random probe vectors.

15. The computer-implemented method of claim 8, wherein iteratively modifying the parameters comprises determining an unbiased stochastic estimator for the expected log-likelihood for a training data item using Monte Carlo sampling.

16. The computer-implemented method of claim 8, wherein iteratively modifying the parameters comprises performing stochastic gradient descent or ascent with a mini-batch of one or more of the training data items at each gradient step.

17. The computer-implemented method of claim 8, wherein the VGP is a layer in a variational deep GP.

18. The computer-implemented method of claim 8, comprising storing the modified first parameters upon a determination that predetermined stopping criteria have been satisfied.

19. A non-transitory storage medium comprising machine-readable instructions which, when executed by processing circuitry of a computer, cause the computer to process training data comprising a plurality of training data items to train a machine-learning model comprising a Gaussian process (GP) model comprising a variational Gaussian process (VGP) corresponding to a GP prior conditioned and marginalised with respect to a set of randomly-distributed inducing variables, wherein said processing of the training data comprises determining parameters of the GP model by:
   initialising first parameters of the GP model, the first parameters including a positive-definite matrix-valued slack parameter; and iteratively modifying the first parameters to increase or decrease an objective function comprising an expected log-likelihood for each training data item of at least a subset of the training data items under a respective Gaussian distribution with a predictive variance depending on the slack parameter, wherein at each iteration modifying the first parameters comprises:
  for each training data item of the at least subset of the training data items, determining a respective gradient estimator for the expected log-likelihood; and
  modifying the first parameters in dependence on the determined gradient estimators, wherein at a target value of the slack parameter:
  the slack parameter is equal to an inverse of a covariance matrix for the set of inducing variables; and
  the objective function corresponds to a variational lower bound of a marginal log-likelihood for a posterior distribution corresponding to the GP prior conditioned on the at least subset of the training data items.

20. The non-transitory storage medium of claim 19, wherein for each training data item of the at least subset of the training data items, the machine-readable instructions cause the respective gradient estimator for the expected log-likelihood to be determined using a respective one of a plurality of processor cores of the computer.

\* \* \* \* \*